No. 650,898. Patented June 5, 1900.
C. KARTOWITZ.
WHIFFLETREE ATTACHMENT.
(Application filed Feb. 17, 1900.)
(No Model.)
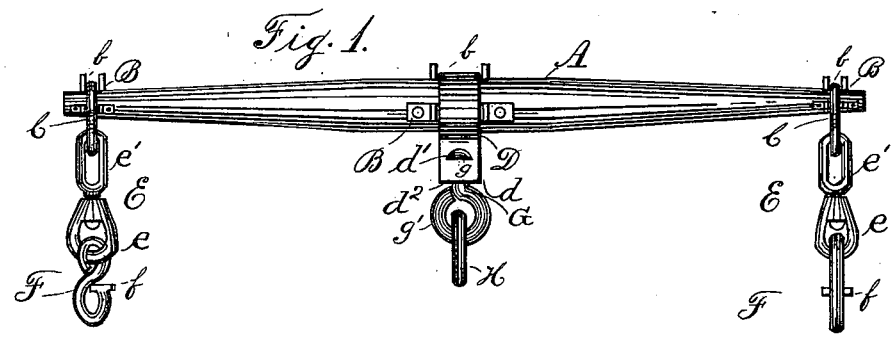
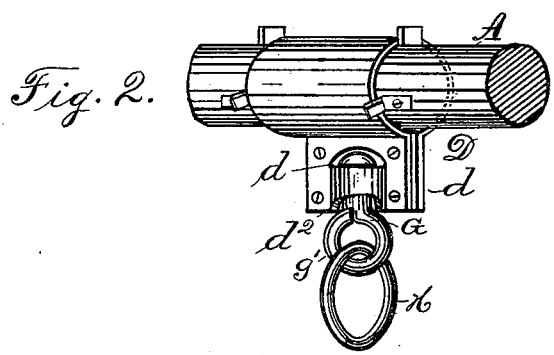
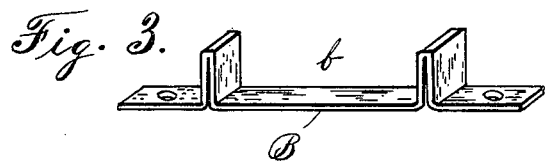
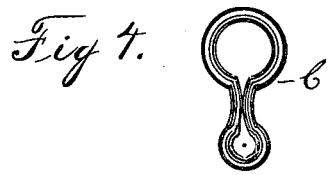
WITNESSES:
INVENTOR
Carl Kartowitz
BY
Thomas P. Simpson
ATTORNEY

UNITED STATES PATENT OFFICE.

CARL KARTOWITZ, OF PELAN, MINNESOTA.

WHIFFLETREE ATTACHMENT.

SPECIFICATION forming part of Letters Patent No. 650,898, dated June 5, 1900.

Application filed February 17, 1900. Serial No. 5,627. (No model.)

*To all whom it may concern:*

Be it known that I, CARL KARTOWITZ, a citizen of the United States, residing at Pelan, in the county of Kittson and State of Minnesota, have invented certain new and useful Improvements in Whiffletree Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to whiffletree attachments, and has for its special object to improve the connection between the whiffletree and traces as well as between the doubletree and the whiffletree. These auxiliary devices will first be described in connection with the drawings and then pointed out in the claim.

Figure 1 of the drawings is a side elevation showing the traces slacked; Fig. 2, an enlarged perspective of a part of the whiffletree with all the auxiliary device attached and partly in section; Fig. 3, an enlarged detail view of my ᴍ-clip that forms a bearing for the loops, and Fig. 4 is a side elevation of a double loop.

In the drawings, A represents the whiffletree, which is made of wood tapering from the middle toward each end. I attach by nails or screws at the middle and near each end the ᴍ-clips B, preferably three in number, at each point, so as to form bearings for the loops C D. Each of these clips has a groove $b$ in the middle of a width to correspond with that of the loop.

C is a double loop which goes upon the ends, while D is a single loop to go on the middle, both loops being loosely secured on the clips B. In the end loops C swing, laterally, a swivel E, consisting of two links $e\ e'$, one swiveled in the other. To the link $e$ is secured a hook F, which engages the trace, the said hook being provided with a T-head $f$ at the point to prevent the escape of the trace.

The device for connecting the whiffletree with the doubletree consists of the single loop D, having projections $d\ d$ extended and brought flatly together, or nearly so, and then cut out at $d'$ and bent to form the open-ended tube $d^2$. In this tube is swiveled the pin G, having the head $g$ at one end and at the other a link $g'$, the latter carrying a ring H. This allows a circular movement in direction of the horse motion, while the swivel permits a similar crosswise motion, thus preventing any twist to the traces, no matter what is the position of the horse.

What I claim as new is—

The loop D having flat ends cut away at $d'$ and bent to form the tube $d^2$, in combination with a doubletree ᴍ-clip B, headed link-pin G, and an ordinary ring H as shown and described, for the purpose specified.

In testimony whereof I affix my signature in presence of two witnesses.

CARL KARTOWITZ.

Witnesses:
 CHARLO ERLANDSON,
 O. H. ENSRUD.